United States Patent [19]
Weber et al.

[11] Patent Number: 5,653,560
[45] Date of Patent: Aug. 5, 1997

[54] METHOD AND APPARATUS FOR FORMING A HOLE IN A WORKPIECE

[75] Inventors: Wolfgang Weber, Leamington; Rade Pupovac, Windsor, both of Canada

[73] Assignee: KVT Technologies Inc., Windsor, Canada

[21] Appl. No.: 584,204

[22] Filed: Jan. 4, 1996

[51] Int. Cl.$^6$ .................... B23B 35/00; B23B 51/05
[52] U.S. Cl. .................. 408/1 R; 408/67; 408/153; 408/225
[58] Field of Search .................... 408/153, 158, 408/80, 224, 225, 1 R, 67; 83/638, 619, 611, 832, 853, 581

[56] References Cited

U.S. PATENT DOCUMENTS

| | | | |
|---|---|---|---|
| 2,435,648 | 2/1948 | Frevel | 408/67 X |
| 2,779,361 | 1/1957 | Mckiff | 408/224 X |
| 2,896,729 | 7/1959 | Brechlin | 408/224 X |
| 3,673,902 | 7/1972 | Strobel | 83/619 X |
| 3,849,019 | 11/1974 | Green | 408/1 X |
| 4,878,786 | 11/1989 | Hedgepeth | 408/225 X |
| 4,884,571 | 12/1989 | Baker | 408/225 X |
| 5,199,830 | 4/1993 | Otani et al. | 408/67 |

*Primary Examiner*—M. Rachuba
*Assistant Examiner*—Henry W. H. Tsai
*Attorney, Agent, or Firm*—Riches, McKenzie & Herbert

[57] ABSTRACT

A boring apparatus which includes a rotatable cutting head used to cut a hole in a workpiece. The cutting head is mounted on an axially movable support, and is rotatable about and reciprocally movable along the axis between a forward cutting position, to engage and cut the workpiece, and a rearward position spaced from the workpiece. Cutting is performed by a cutting blade which is spaced radially from the axis, and which is movable relative to the rest of the cutting head by a blade advance mechanism. During cutting operation, the blade advance mechanisms move cutting blade both forwardly and radially inwardly through the workpiece wall, in the same direction at which the blade is inclined. The hole is thus formed by lowering the cutting head and then rotating the cutting blade as the blade advance mechanism moves the blade at an angle through the workpiece. Both the resulting hole and waste plug cut from the workpiece produced by the angled movement of the blade have complementary tapered edge portions, with the result that the plug will have a portion with a diameter which is larger than the smallest diameter portion of the hole.

19 Claims, 7 Drawing Sheets

METHOD AND APPARATUS FOR FORMING A HOLE IN A WORKPIECE

The present invention relates generally to a boring tool having a rotating cutting head for forming a hole in a workpiece, and more particularly, to a boring tool having a radially inwardly moving cutting blade on the cutting head which forms a hole having inwardly tapering side edges by removing a complementary shaped waste plug.

BACKGROUND OF THE INVENTION

Various apparatus are known for use in boring and cutting holes through workpieces. Conventional boring apparatus typically include a rotating cutting head which moves along an axis while it rotates thereabout to contact a portion of a workpiece. A cutting blade extending forwardly from the cutting head parallel to and spaced from the axis performs the cutting operation, such that the rotation of the cutting head moves the blade along a circular path in a plane perpendicular to the axis. The hole is formed by advancing the cutting head along the axis towards the workpiece as it is rotated, until the cutting blade is moved completely through the workpiece.

A major disadvantage of conventional boring tools is that both the hole which is formed, and the waste slug or plug which is cut from the workpiece, have side edges parallel to the axis. As a result, the waste slug or plug often falls through the hole into the workpiece. This is particularly undesirable where the tool is used to form holes in blow moulded hollow workpieces as often the plugs are difficult to retrieve and must be manually removed.

In an attempt to prevent waste plugs from falling into the workpiece, some boring tools are provided with a slug retainer or piercing pin on the cutter head. The piercing pin typically includes an enlarged arrow-head like tip portion, and has a length selected so that it pierces the workpiece wall before the slug is fully cut out. Once the cutting operation is completed, the cutting head is moved away from the workpiece carrying the cut waste plug thereon. Boring tools which incorporate conventional plug retention mechanisms suffer the disadvantage in that they require time consuming recalibration for each different workpiece line, to ensure that the piercing pin moves the correct distance through the workpiece sidewall.

A further disadvantage with conventional boring tools exists in that they are not well suited for use with workpieces which are formed from blow moulded plastics, such as high density polyethylene or polypropylene, and which are used to make plastic automotive fuel tanks, brake-fluid reservoirs as well as other non-automotive parts. The blow moulding process inherently produces workpieces which differ in precise structure from one workpiece to the next. Because conventional boring apparatus move through a series of preset movements, their performance is dependent on the workpiece wall thickness, surface finish, plastic temperature and location of the portion of the workpiece wall which is to be cut. As the blow moulding process produces variations in wall thickness, surface thickness and even wall configuration, it is almost impossible to preset most boring apparatus to optimally perform cutting operation on every workpiece of a given product line. Depending on the variations in wall configuration and/or thickness, existing boring tools suffer the disadvantage that if the system is not correctly set up, cutting may commence without proper coupling between the piercing pin and plug. The waste plug may therefore be pushed into the workpiece and/or stripped from the slug retainer pin inside the workpiece when the cutting head is retracted.

SUMMARY OF THE INVENTION

To at least partially overcome the disadvantages of conventional boring tools, the present invention provides for a boring apparatus which in cutting operation cuts a waste plug from a workpiece which is physically too large to pass through the formed hole. The apparatus includes a movable cutting head which is rotatable about an axis, and which includes a cutting blade which is spaced radially outwardly from the axis and which angles inwardly at an angle theretowards. The cutting blade is movable relative to a remainder of the cutting head such that during cutting operation the blade is moved forwardly and radially inwardly towards the axis through the workpiece. As the cutting blade is rotated, its forward and radially inward movement cuts a plug from the workpiece which has sidewalls which taper inwardly in the direction of forward movement of the cutting head. The angle at which the cutting blade advances towards the axis is preferably selected so that each of the hole and plug have tapered edge portions which are complementary to one another, with the plug having a large diameter portion which is larger than the smallest diameter portion of the hole. The complementary tapered edges of the plug and hole thereby prevent the plug from physically passing through the hole into the workpiece where it might otherwise have to be manually removed.

Another object of the invention is to provide a boring apparatus which includes a movable cutting head and a sensor for sensing the position of the cutting head relative to the workpiece, and positioning the cutting head in an optimum position to perform cutting operations thereon.

A further object of the invention is to provide a boring apparatus particularly suited for use in forming holes through the walls of blow moulded plastic workpieces which have variable wall thicknesses and/or inconsistent wall heights or configurations.

Another object of the invention is to provide a boring apparatus which is readily adaptable to perform hole forming operations in a number of different workpiece product lines without requiring extensive recalibration of the apparatus prior to the resumption of cutting operations.

In one embodiment, the present invention provides a boring apparatus which includes a rotatable cutting head used to cut a hole in a workpiece. The cutting head is mounted on an axially movable support. The cutting head is rotatable about and reciprocally movable along the axis on the support between a forward cutting position, where a cutting blade on the cutting head engages and cuts the workpiece, and a rearward position where the cutting blade is spaced from the workpiece. Cutting is performed by the cutting blade which is spaced radially from the axis and projects forwardly beyond the rest of the cutting head at an angle inclined towards the axis. The cutting blade is movable relative to the rest of the cutting head by a blade advance mechanism. During cutting operation, the blade advance mechanisms moves the cutting blade both forwardly and radially inwardly a distance until the blade is moved through the workpiece wall, in substantially the same direction along which the blade is inclined. The hole is thus formed by moving the cutting head to the cutting position and then rotating the cutting head and cutting blade as the blade advance mechanism moves the blade through the workpiece. In this manner, a waste slug or plug is cut from a remainder of the workpiece and form the hole.

The movement of the inclined cutting blade at an angle toward the axis as it advances through the workpiece produces side edges on both the plug and hole which taper radially inwardly towards the axis in the direction of forward movement of the cutting head. Depending on the thickness of the workpiece sidewall and the thickness of the kerf formed by the cutting blade, the angle at which the side edges of the plug and hole taper may be selected so that the side edges of the plug and hole have a complementary fitted shape, wherein the largest diameter portion of the plug is larger than the smallest diameter portion of the hole to physically prevent movement of the plug forwardly through the hole.

The cutting blade has a length selected to permit its movement through the workpiece to completely remove the plug. The blade may be of a number of possible constructions, including a thin needle-like blade, a flat planar or polygonally shaped blade, but preferably is of generally triangular shape with a "shark-tooth" profile, wherein the blade is slightly curved in the direction of its rotational movement. The cutting blade projects forwardly from a remainder of the cutting head at an angle inclined towards the axis at an angle of between about 1° and 50°, and more preferably at between about 4° and 15°, depending on the wall thickness of the workpiece and the material which is to be cut.

Where the boring tool is to be used to form holes through the sidewall of blow moulded plastic workpieces, such as automotive fuel tanks, windshield washer fluid reservoir or the like, it is preferable that the tool also include a positioning sensor which senses the portion of the workpiece which is to be removed, and adjusts in the positioning of the cutting head prior to cutting. By sensing the portion of the workpiece which is to be cut, and positioning the cutting head relative thereto, the cutting blade may be consistently located in an optimum starting position prior to commencement of the cutting operation, regardless of variations in wall thicknesses or surface locations introduced by the blow moulding process. It is to be appreciated that as a result of the cutting blade moving both axially and radially inwardly during the cutting operation, the initial positioning of the cutting blade relative to the surface of the workpiece becomes more critical with the present invention than compared with tools having cutting blades which move in the axial direction alone. The inclusion of a positioning sensor as the mechanism by which the cutting head is positioned also permits the tool to be used on a number of different workpiece product lines, without requiring the time consuming recalibration of the tool associated with conventional boring tools.

The boring apparatus may also includes a piercing pin which is used to releasably retain and remove the plug which is cut from the workpiece. The piercing pin may, for example, extend from the cutting head and operate in conjunction with the positioning sensor to position the cutting head in a starting position on initial contact of the piercing pin with the workpiece. Once contact with the workpiece is sensed, the piercing pin can be moved forwardly a predetermined distance through the workpiece to couple the portion of the workpiece to the pin. Although a piercing pin advantageously provides a simplified mechanism to retain the waste slug or plug, it is to be appreciated that other retaining mechanisms such as suction apparatus and the like may also be used with appropriate modifications.

Accordingly, in one aspect the present invention resides in a method of using a boring apparatus to form a hole in a workpiece, the apparatus comprising rotatable cutting means for cutting a portion of said workpiece as a generally circular plug, support means for supporting said cutting means thereon, the support means having a forward portion and being reciprocally movable along an axis between a first position wherein said forward portion is spaced towards said workpiece and a second position wherein said forward portion is moved away from said workpiece, drive means for driving said cutting means in rotational movement, and retaining means for releasably retaining said plug, the retaining means being activatable between an initial release position wherein said portion of said workpiece is released from said apparatus and a retaining position wherein said portion of said workpiece is retained thereby, said cutting means disposed on said forward portion and being rotatable about said axis, the cutting means including a cutting blade spaced radially from said axis, whereby the rotation of the cutting means rotates the cutting blade along an arcuate path, said cutting blade extending forwardly away from said support means at an angle inclined towards said axis, and being reciprocally movable between a retracted blade position and an extended blade position moved forwardly and radially inwardly relative to the retracted blade position, blade advance means for reciprocally moving said cutting blade between said retracted blade position and said extended blade position wherein on moving said cutting blade from the retracted blade position to the extended blade position, the blade advance means moving said cutting blade forwardly and in a radially inward direction toward said axis substantially at said angle at which said cutting blade is inclined, said hole formed by the steps of, positioning said support means in said second position and said cutting blade in said retracted blade position, moving said portion of said workpiece into alignment with said axis, moving said support means to said first position, activating said retaining means to said retaining position to retain said portion of said workpiece, and activating said blade advance means to move said cutting blade to said extended blade position in said radial inward direction through said workpiece while said cutting means is rotated by said drive means, wherein the advance of said cutting blade through the workpiece cuts said plug from a remainder of said workpiece and forms said hole with each of said plug and said hole having generally complementary tapered edge portions.

In another aspect, the present invention resides in an apparatus for forming a hole in a workpiece, the apparatus comprising rotatable cutting means for cutting said workpiece to remove a portion thereof as a generally circular plug, support means for supporting said cutting means thereon, the support means having a forward portion and being reciprocally movable along an axis between a first position wherein said forward portion is spaced towards said workpiece and a second position wherein said forward portion is moved away from said workpiece, drive means for driving said cutting means in rotational movement, said cutting means disposed on said forward portion and being rotatable about said axis and including cutting blade means and blade advance means, the cutting blade means spaced radially from said axis, and extending forwardly away from said support means at an angle inclined towards said axis, whereby the rotation of the cutting means rotates the cutting blade means along an arcuate path centered on said axis, the blade advance means for moving said cutting blade means simultaneously forwardly and in a radially inward direction towards said axis substantially at said angle at which said cutting blade means is inclined, a reciprocally movable piercing pin movable between a forward position and a retracted position rearward of the forwardmost position, the pin projecting forwardly from said forward portion of the support means at a position spaced radially inwardly from said arcuate path towards said axis, positioning means activatable to move the pin between the forward and retracted positions, the pin having an enlarged tip portion and a length selected so that when said support means is moved to said first position and said pin is moved to the forward position, said tip portion pierces and extends through the portion of the workpiece to couple it to said pin, and when the support means is in the first position the blade advance means is activatable to move the cutting blade means through the workpiece as said cutting means is rotated to cut said plug from said remainder of said workpiece and form said hole with each of said plug and said hole having generally complementary tapered edge portions.

In a further aspect, the present invention resides in a boring apparatus for forming a hole in a workpiece, the apparatus comprising rotatable cutting means for cutting a generally circular plug from a remainder said workpiece, support means for supporting said cutting means thereon, the support means having a forward portion and being reciprocally movable along an axis between a first position wherein said forward portion is spaced towards said workpiece, and a second position wherein said forward portion is moved away from said workpiece, drive means for- driving said cutting means in rotational movement, and retaining means for releasably retaining said plug, said retaining means being movable between a retaining position wherein said plug cut from said remainder of said workpiece is retained by said retaining means to substantially prevent its movement through the hole, and a release position remote from said hole wherein said plug is released from said apparatus, said cutting means disposed on said forward portion and being rotatable about said axis, and including a cutting blade and blade advance means, the cutting blade spaced radially from said axis, and extending forwardly away from said support means at an angle inclined towards said axis, whereby the rotation of the cutting means rotates the cutting blade along a substantially arcuate path, the blade advance means for moving said cutting blade forwardly and in a radially inward direction towards said axis substantially at said angle at which said cutting blade is inclined, whereby when the support means is in the first position the blade advance means is activatable to move the cutting blade through the workpiece while said cutting means is rotated, to cut said plug from said remainder of said workpiece and form said hole, with each of said plug and said hole having generally complementary tapered edge portions.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
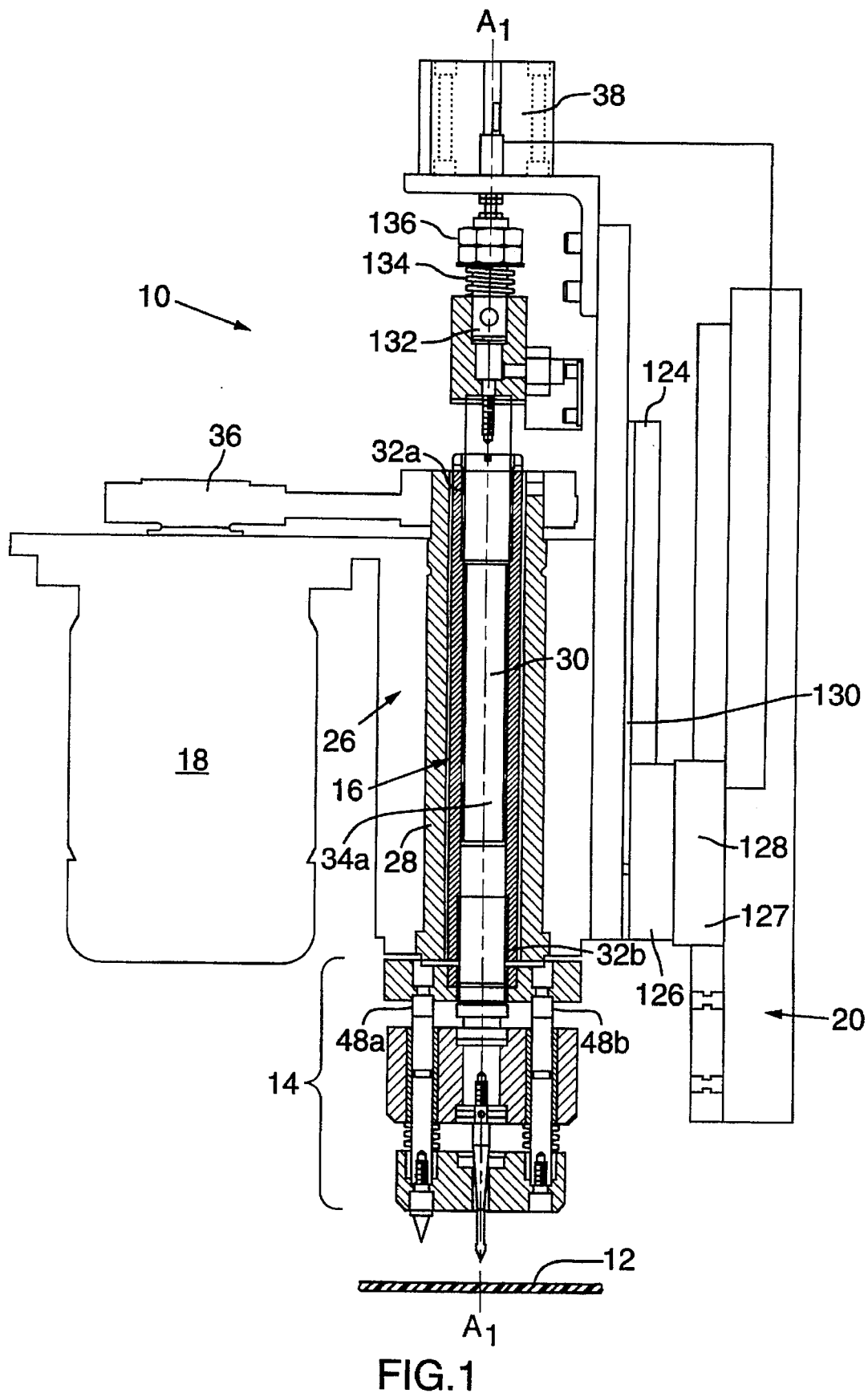
FIG. 1 is a partial cross-sectional front view of a boring apparatus in accordance with a preferred embodiment of the invention with a cutting head assembly moved to a fully retracted start position.

Reference is made first to FIG. 1 which shows a boring apparatus 10 for use in forming one or more holes through the wall of a workpiece 12, in accordance with the preferred embodiment of the invention.

FIG. 1 shows best the apparatus 10 as including a cutting head assembly 14, a spindle assembly 16, a drive motor 18 and a slide assembly 20. In the preferred embodiment shown in the Figures, the workpiece 12 is positioned vertically beneath the cutting head assembly 14 and the cutting head assembly 14 is moved forwardly along a vertical axis $A_1$ in a downward direction to engage and cut a circular waste plug 22 from the workpiece 12. It is to be appreciated, however, that the workpiece 12 need not be positioned vertically below the apparatus 10. Depending on the desired location of the hole 11, the cutting head assembly 14 could equally be movable forwardly to engage the workpiece 12 along a horizontal or inclined axis without departing from the scope of the present invention.

Figure 2:
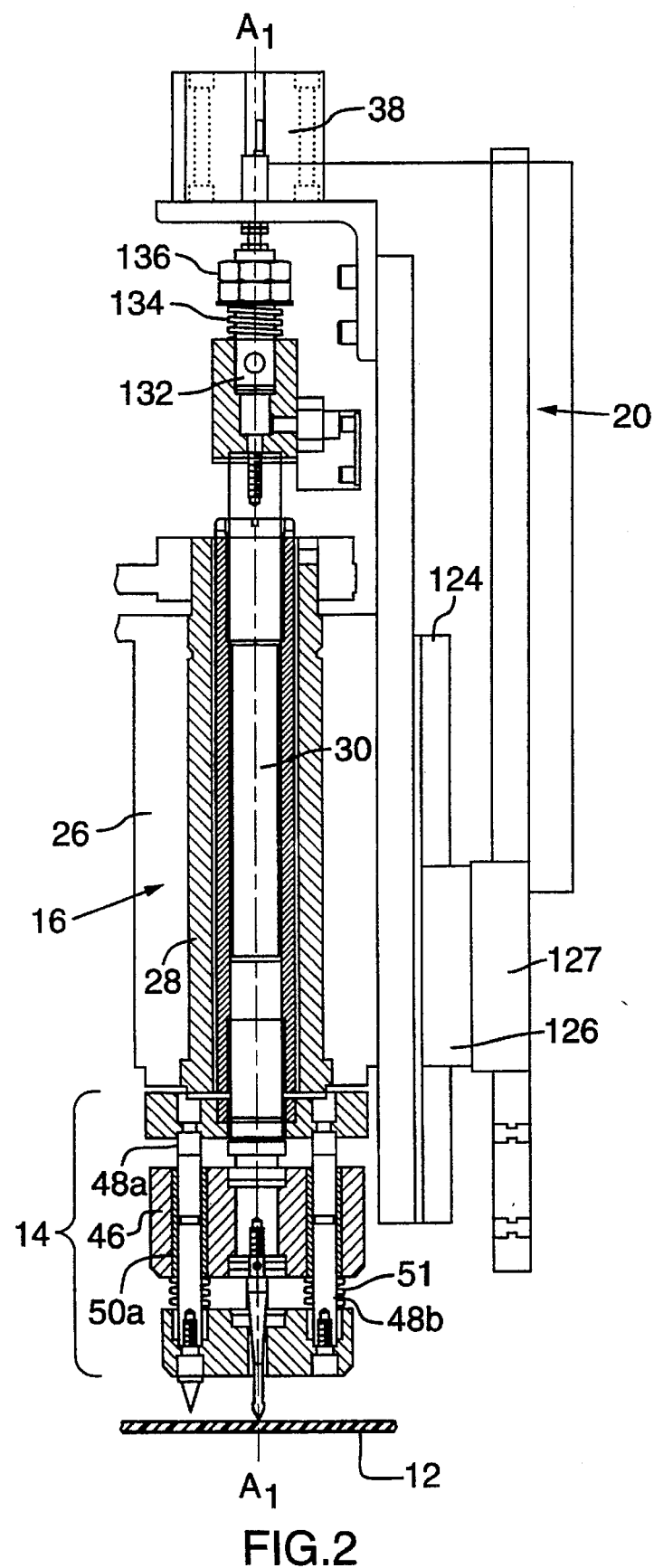
FIG. 2 is a partial cross-sectional front view of the boring apparatus of FIG. 1 with the cutting head assembly moved forwardly to a workpiece sensing position.

As seen best in FIGS. 1 and 2, the cutting head assembly 14 is supported on the lower forwardmost end portion of the spindle assembly 16, with the entire spindle assembly 16 and the cutting head assembly 14 reciprocally movable along the slide assembly 20 in the direction of the axis $A_1$. The spindle assembly 16 includes an exterior steel or aluminum casing 26 and an elongated hollow cylindrical spindle 28. The spindle 28 is rotatably mounted within the casing 26 in a vertical orientation with the axial center of the spindle 28 co-axial with the axis $A_1$, with the spindle 28 being rotatable thereabout.

A cylindrical shaft 30 is mounted in the spindle assembly 16, extending vertically through the hollow center of the spindle 28. The shaft 30 is maintained a radially inward spaced distance from the spindle 28, in alignment with the axis $A_1$, by a pair of bushings 32a,32b located at the upper and lower ends of the spindle assembly 16 whereby the shaft 30 may be moved axially through the spindle 28 and the spindle 28 freely rotates about the shaft 30. As will be described in detail hereafter, FIG. 1 shows best the shaft 30 as being attached at its uppermost end to a sensor assembly 132 and pneumatic drive mechanism 38. The lowermost end of the shaft 30 is formed having successively reduced diameter sections 34a, 34b and 34c. A forwardmost end of section 34a is proved with an enlarged radially projecting shoulder 35a, with the forwardmost end of section 34b including an enlarged radially projecting shoulder 35b. Vertical movement of the shaft 30 is performed by activating the pneumatic drive mechanism 38 (FIG. 1) coupled to the upper rearward end of the shaft 30, and which as will be described hereafter is used to control the advance and/or retraction of the cutting blade during cutting operation.

The drive motor 18 is secured to the side of the casing 26, with the motor 18 activatable to drive the spindle 28 in rotation about the axis $A_1$ by means of a motor linkage 36. In this manner, the spindle assembly 16 is slidably coupled to the slide assembly 20, so that the entire spindle assembly 16, cutting assembly 14, drive motor 16, shaft 30 and pneumatic drive mechanism 38 are reciprocally movable in the vertical direction as a unit, either forwardly downward towards the workpiece 12 or rearwardly upward away therefrom.

Figure 3:
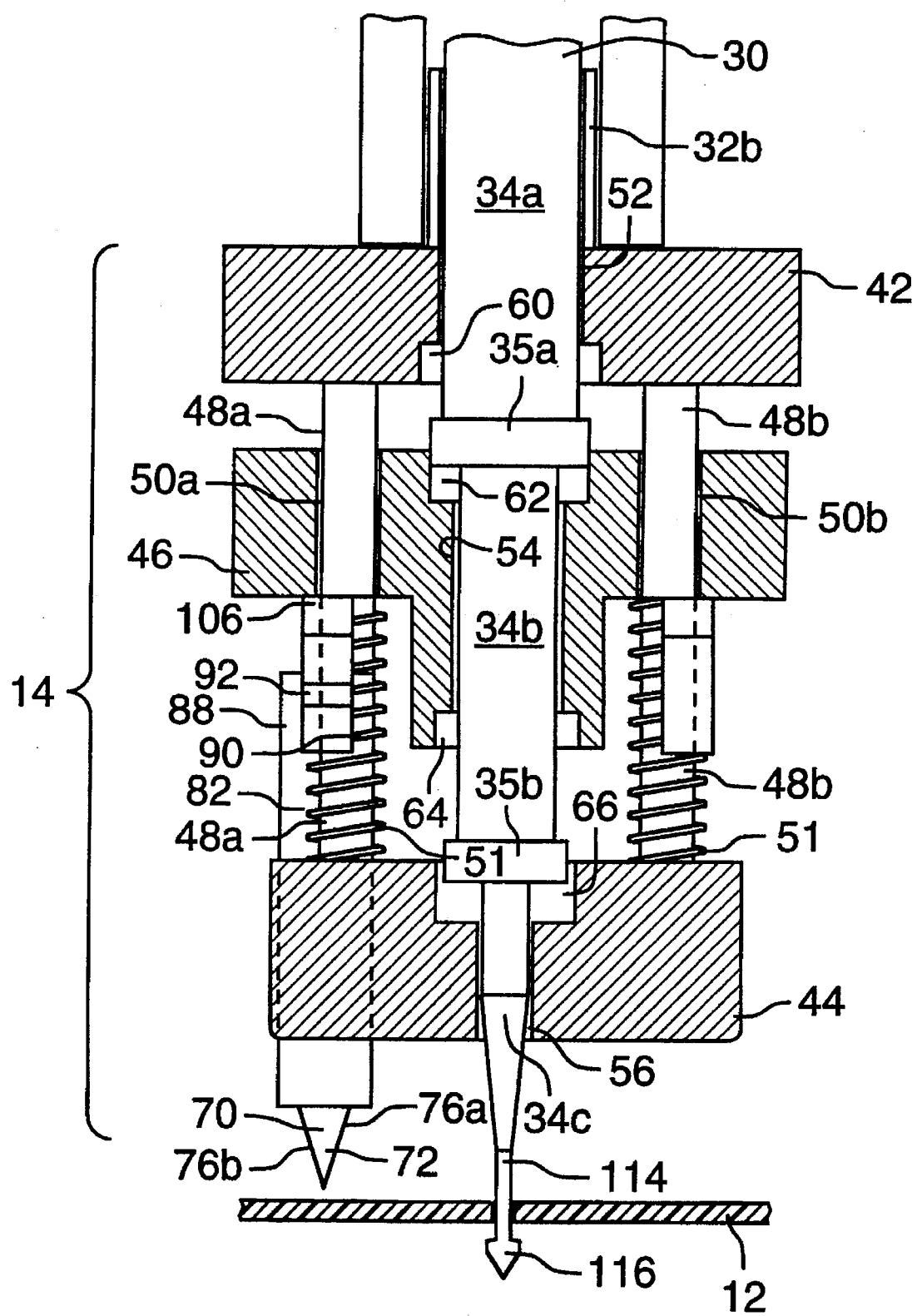
FIG. 3 is an enlarged partial schematic front view of the cutting head assembly shown in FIG. 2, with a piercing pin moved to a plug retaining position, prior to cutting operation.

FIG. 3 shows best the cutting head assembly 14 mounted on the forwardmost end of the spindle 28 for rotation therewith about the axis $A_1$. The cutting head assembly 14 is formed having three axially spaced sections: an uppermost anchor plate 42 which is spaced rearwardmost from the workpiece 12; a forwardmost guide plate 44 spaced closest to the workpiece 12; and a camming plate 46 positioned between the anchor plate 42 and the guide plate 44.

Two spaced axially parallel solid steel cylindrical guide shafts 48a,48b couple the guide plate 44 to the anchor plate 42. The guide shafts 48a,48b extend through complementary sized bores 50a,50b formed in the camming plate 46, with the camming plate 46 movable along the shafts 48a,48b in the direction of axis $A_1$ relative to each of the plates 42,44.

A helical spring 51 disposed about each guide shaft 48a,48b between the camming plate 46 and guide plate 44, is sized to engage each plate 46,44 and resiliently bias the camming plate 46 to a position spaced appart from the guide plate 44.

Each of the anchor plate 42, camming plate 46 and guide plate 44 include axially extending hollow bores 52,54,56 therethrough. The hollow bores 52,54,56 have a radial diameter marginally greater than respective sections 34a, 34b,34c of the shaft 30 thereby permitting substantially free rotational movement of the cutting head assembly about the shaft 30. As seen best in FIGS. 4 to 6, the forwardmost end of bore 52 and rearward most end of bore 54 are provided as enlarged diameter portions 60,62, each sized to receive therein the shoulder portion 35a of shaft section 34a.

Similarly, the forwardmost end of bore 54 and rearwardmost end of bore 56 are provided with enlarged diameter portions 64,66, which are sized to receive therein shoulder portion 35b of shaft section 34b.

Figure 4:
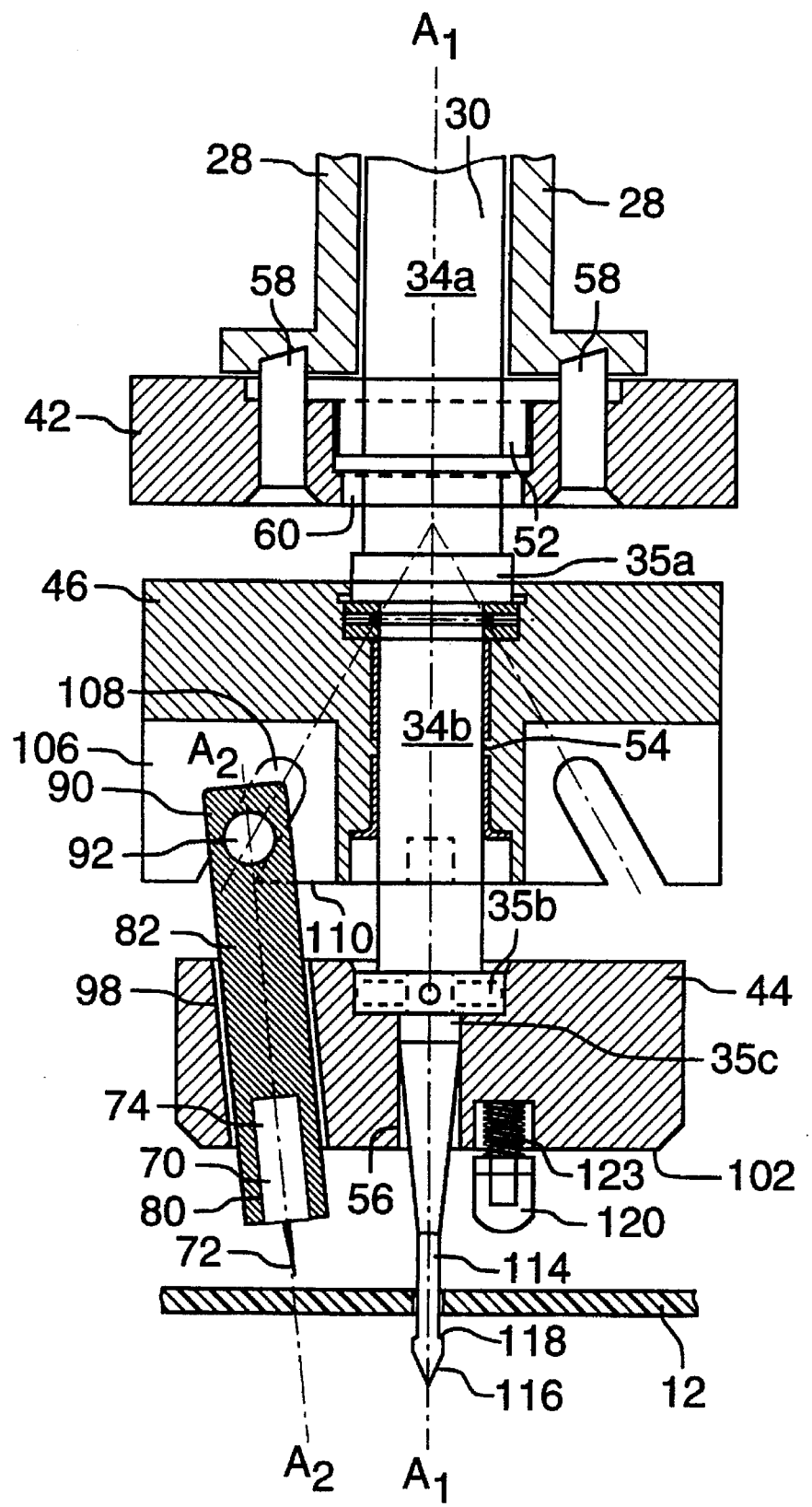
FIG. 4 is a partial cross-sectional side view of the cutting head assembly of FIG. 3.

The anchor plate 42 is coupled to the forward end of the spindle 28 by means of a number of spaced screw fasteners 58 (FIG. 4). With this construction, the anchor plate 42 is driven in rotation in a plane generally perpendicular to the axis $A_1$, with the rotation of the spindle 28 by the drive motor 18. The remaining sections of the cutting head assembly 14 are also driven in rotation about the axis $A_1$ by the spindle 28, by the coupling the camming plate 46 to the guide plate 44 and the camming plate 46 to the plates 42, 46 via the guide shafts 48a,48b.

Workpiece cutting is performed by a cutting blade 70 which, as seen best in FIGS. 3 and 4, includes a generally triangular shaped tip 72 formed piece of high speed steel which has a shark-tooth shaped profile, a slightly tapered shape, and a generally round blade shank 74. The shape of the tip 72 shown in FIG. 3, although not essential, advantageously enables the blade to be provided with two oppositely facing cutting edges 76a,76b to permit cutting in opposite directions.

FIG. 4 shows best the mounting of the cutting blade 70 to the remainder of the cutting head assembly 14. The cutting blade 70 is replaceably housed in the end of an elongated generally cylindrical blade holder 82. The blade 70 is held in place by inserting the shank 74 in a complementary shaped socket 80 formed in the forwardmost end of the elongated cylindrical blade holder 82, and securing the blade 70 thereto by means of a locking screw 84 (seen in FIG. 7). With the holder 82 shown, the blade 70 is secured in place with the tip 72 extending in the forward direction substantially parallel to the elongate sides of the holder 82. The releasable retention of the cutting blade 70 in the holder 82 advantageously permits simplified replacement of worn cutting blades. As seen best in FIG. 3, the blade holder 82 extends upwardly into a pair of spaced generally rectangular fingers 88,90. A camming pin 92 extends between the fingers 88, 90 towards the uppermost end of the holder 82 which, as will be described hereafter, cooperates with the camming plate 46 to urge the blade 70 through the workpiece 12 during cutting operation, and wherein the camming plate 46 and guide plate 44 act in concert to guide the cutting blade 70 in movement during cutting operation.

FIG. 4 shows best the guide plate 44 as having a cylindrical guide channel or hole 98 which extends along an axis $A_2$. The guide hole 98 is formed through the plate 44 having generally round in cross-section and has a slightly larger complementary size to the holder 82. The guide hole 98 extends from an upper opening in the rearward surface 100 of the plate 44 at a point spaced radially from the axis $A_1$, to a front opening on the forward facing surface 102 of the plate 44 radially inwardly from the upper opening. The hole 98 slopes forwardly from the back of the plate 44 to its front with the axis $A_2$ inclining toward the axis $A_1$ at an angle of between about 3° and 16°, and more preferably at about 7° inclined relative to the axis $A_1$. When the holder 82 is inserted into the hole 98, the holder 82 is slidably received therein aligned with the axis $A_2$ and inclining forwardly towards the axis $A_1$.

Figure 5:
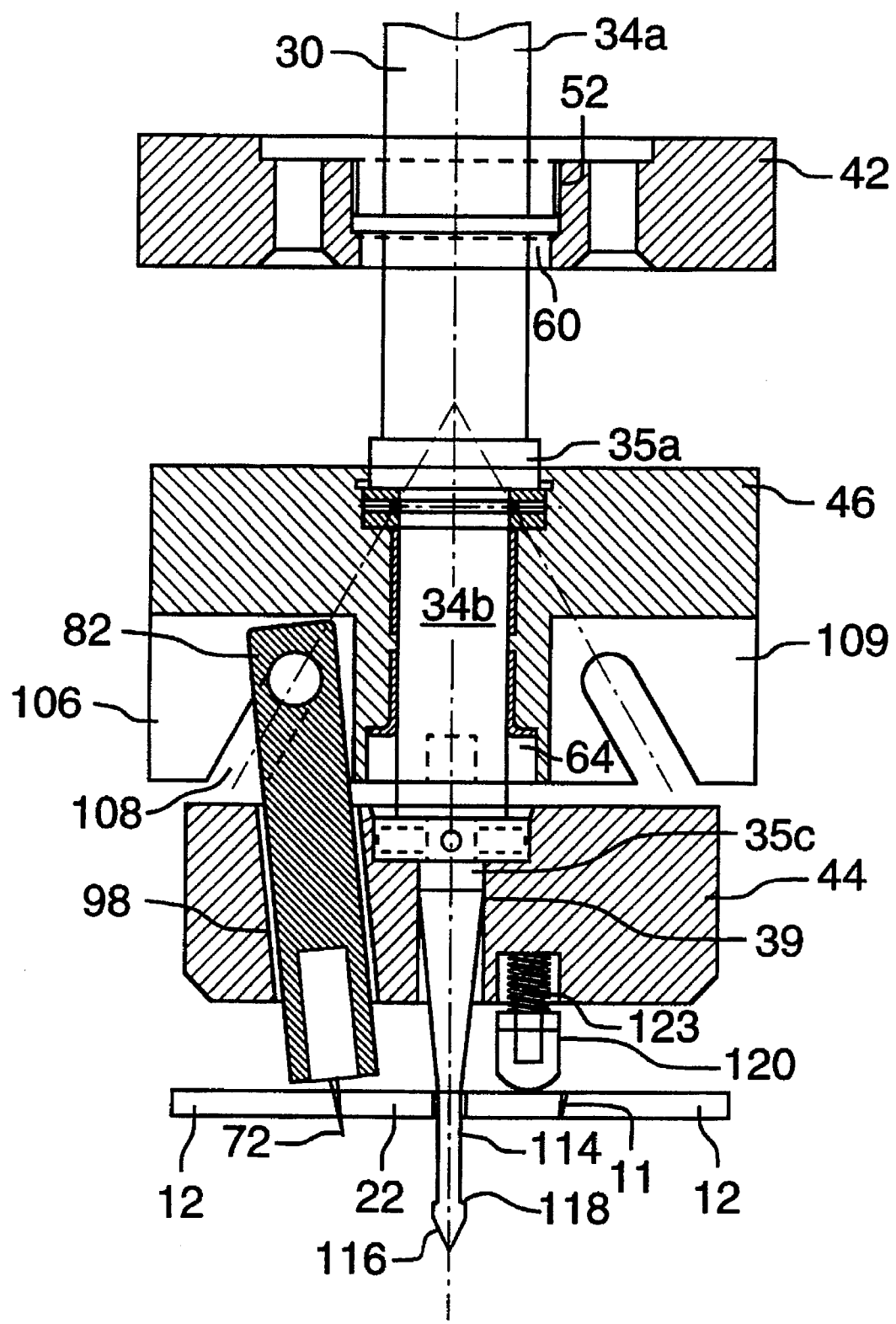
FIG. 5 is a partial cross-sectional side view of the cutting head assembly shown in FIG. 3 with the cutting blade advanced through the workpiece.
Figure 6:
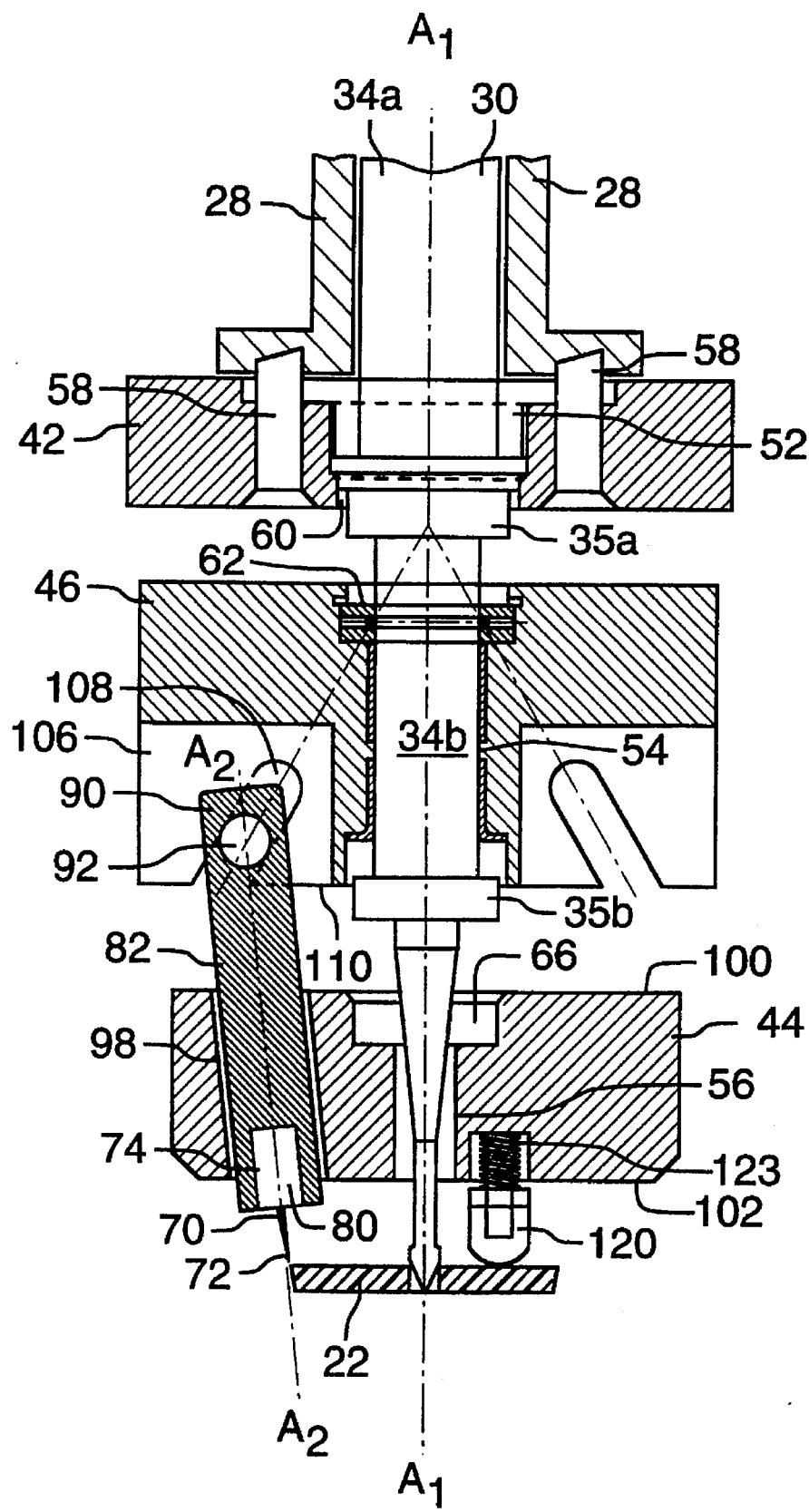
FIG. 6 is a partial cross-sectional side view of the cutting head of FIG. 3 with the cutting head assembly retracted to the start position and a knock-off pin engaging the waste plug.

The camming plate 46 includes on a forwardmost surface a planar guide web 106. The guide web 106 extends radially from the axis $A_1$ and has a thickness selected to permit its movement between the fingers 88,90 (seen best in FIG. 3). A camming slot 108 is formed in the forwardmost edge 110 of the web 106 which is sized to slidably receive therein the pin 92. The slot 108 extends from the edge 110 rearwardly at an angle inclined towards the axis $A_1$ at an angle of between about 20° and 40° and more preferably about 30°. FIGS. 4 to 6 further show the camming plate 109 as including a second guide web 109 which is spaced axially opposite to the guide web 106. The web 109 is identical to web 106 and although not essential, advantageously acts to balance the camming plate 46. Although not shown, it is to be appreciated that by the inclusion of web 109, two cutting blades 70 could be provided in the apparatus 10, with modification to the guide plate 44 to include a second guide slot.

With the foregoing construction, the cutting blade 70 is coupled to the remainder of the cutting head assembly 14 in an operative position spaced radially outwardly from the axis $A_1$. The blade 70 is slidable relative to the guide plate 44, with the blade holder 82 slid into the guide hole 98 so that the guide web 106 is inserted between the holder fingers 88,90 and the camming pin 92 locates within the camming slot 108. The opposing angles of the angled slope of the camming slot 108 and that of the guide hole 98 permit reciprocal movement of the holder 82 in the slot 92 along the axis $A_2$ as the spacing between the guide plate 44 and camming plate 46 is varied. In addition, the angles of the camming slot 108 and guide hole 98 effectively couple the holder 82 to the plates 44, 46 to prevent the holder 82 from slipping from the cutting head assembly 14.

With the configuration shown in FIG. 4, the rotation of the spindle 28 thereby rotates the cutting blade 70 along an arcuate path of a circle centered on and symmetrical about the axis $A_1$.

A piercing pin 114 is provided at the foremost end of the shaft section 35c aligned with the axis $A_1$. The piercing pin 114 is coupled to the end of Section 35c by a threaded connection (shown as 39 in FIG. 5). The pin 114 includes a forwardmost enlarged arrowhead-shaped tip 116 which extends forwardly beyond the front surface 102 of the plate 44, a distance past the tip of the cutting blade 70. Under forward pressure the enlarged tip 116 pierces the portion of the workpiece 12 aligned with the axis $A_1$, whereupon rearward facing shoulders 118 on the tip 116 couple the portion of the workpiece 12 to the pin 114. The piercing pin 114 is reciprocally movable along the axis $A_1$ with the shaft 30 relative to the cutting head assembly 14, between a forward position shown in FIG. 5, where the tip 114 is extended forwardly relative to the guide plate 44 to move the tip 112 through the workpiece 12, and a retracted position shown in FIG. 6 where the tip 116 is moved rearwardly therefrom.

FIGS. 4 to 6 show best one of three knock-off pins 120 which are provided at spaced locations about the pin 114 and which extend from the forward surface 102 of the guide plate 44. In the embodiment shown, the knock-off pins 120 are axially movable and are resiliently biased to an extended position by means of spring 123. Alternately, the knock-off pins could be provided on the forward end of a reciprocally movable plunger which may be extended forwardly to a plug engaging position whereby the pin 120 is moved forwardly therefrom.

FIGS. 1 and 2 show best the reciprocal movement of the spindle assembly 16, cutting head assembly 14 and drive motor 18 in the direction of axis $A_1$ on the slide assembly 120. An elongated guide track 124, aligned in its longitudinal direction with the axis $A_1$, is provided on the casing 26. The guide track 124 is provided with complementary guide bushing 126 to permit relative sliding in the direction of axis $A_1$ while coupling the casing 26 to the slide assembly 16.

Sliding movement of the guide track 124, and spindle assembly 16 relative to the guide bushing 126, is achieved by the activation of a pneumatic locking cylinder 127. The deactivation of the locking cylinder 127 effectively preventing further movement of the spindle assembly 16 in position relative to the slide assembly 20. While the use of a locking cylinder 127 is shown, it is to be appreciated that other means of moving the spindle assembly 16 are also possible, including hydraulic cylinders, motor driven pinion and rack assemblies, and the like.

The sensor 132 is provided at the rearward end of the shaft 30. The sensor 132 is electronically coupler to the activation and/or deactivation of the locking cylinder 127. The sensor 132 is activated optically by the rearward movement of the shaft 30 relative to the assembly 16 against the resilient bias of a coil spring 134, as for example, occurs when the forward end of the pin 114 first engages the surface of the workpiece 12 as the spindle assembly 16 is lowered by cylinder 127.

In use of the apparatus 10, the locking cylinder 127 is initially activated to move the spindle assembly 16, together with the cutting head assembly 14 and drive motor 18 upwardly to an initial starting position, as shown in FIG. 1. The pneumatic drive cylinder 38 is further activated to fully retract shaft 30 moving shoulder 35a into recess 60 and shoulder 35b into recess 64. As the shaft 30 retracts, the engagement of the shoulder 35b with the plate 46, combined with the resilient bias of the springs 51, moves the plate 46 relative to the plates 42,44 along the axis $A_1$ so that the spacing between plate 42 and 46 is minimized, while providing maximum spacing between the plate 46 and plate 44. The movement of the camming plate 46 upwardly relative to the guide plate 44 retracting the cutting blade 70 by the engagement of the web 106 with pin 92. pin 92.

The workpiece 12 is next positioned beneath the cutting head assembly 14 with the portion of the workpiece 12 which is to be removed as the waste plug 22, aligned with and centered on the axis $A_1$.

The cutting operation is then initiated by advancing spindle assembly 16, cutting head assembly 14 and motor assembly 18 on the slide assembly 20 towards work piece 12. With the workpiece 12 in position, pneumatic cylinder 127 is activated to lower the spindle assembly 16 to move the shaft 30 forwardly along the axis $A_1$. As soon as the slug retainer pin 114 contacts the work piece 12, the shaft 30 is pushed back against spring 134, hence activating sensor 132 which results in the deactivation of cylinder 127.

The cylinder 127 thereby locks spindle assembly 16 in the position shown in FIG. 2, with the retracted piercing pin 114 engaging the upper surface of the workpiece 12 and the cutting blade 70 spaced a minute distance therefrom.

The drive motor 18 is started to rotate the spindle 28 by means of the motor linkage 36, thereby activating the cutting head 14 and cutting blade 70 into rotational movement about the axis $A_1$. The pneumatic drive mechanism 38 is then activated to move the shaft 30 forwardly about 30 mm. As the shaft 30 moves forwardly about an initial 15 mm, the pin 114 advances, moving the enlarged tip 116 downwardly, to pierce the surface of the workpiece 12, coupling it to the apparatus 10 in the manner shown in FIG. 3.

As the shaft 30 advances the last 15 mm, the shoulder 35a of shaft 30 is moved into engagement with the portion 62 to advance the camming plate 46 along axis $A_1$ against the springs 51 and towards the guide plate 44. As the camming plate 46 moves towards the guide plate 44, the camming pin 92 of the blade holder 82 moves upwardly in the camming slot 108. The relative forward motion of camming plate 46 causing the blade holder 82 and cutting blade 70 to advance both forwardly and radially inwardly along the axis $A_2$ towards the axis $A_1$, as the holder 82 slides along the guide hole 98. The angled orientation of the guide hole 98 and camming slot 108, advances the rotating cutting blade 70 through the workpiece 12 along the axis $A_2$ substantially at the same angle at which the cutting blade 70 is inclined relative to the workpiece 12. The advance of the rotating cutting blade 70 through the workpiece 12 thereby cuts the waste plug 22 from the remainder of the workpiece 12 to form the desired hole 11.

On the completion of the cutting operation once the plug 22 is completely formed, the pneumatic locking cylinder 127 is again activated and the spindle assembly 16, cutting head 14 and motor assembly 18 are moved upwardly, rearwardly away from the workpiece 12 on the slide assembly 20, returning to the initial start position. As the spindle assembly 16 is moved upwardly, the shoulders 118 of the enlarged tip 116 of on the piercing pin 114 engage the underside of the cut plug 22 removing it clear of the hole 11.

With the spindle assembly 16 returned to the starting position, and the finished workpiece 12 removed from beneath the boring apparatus 10, the pneumatic cylinder 38 is retracted to return the shoulder 35b into the recess 64, and shoulder 35a into recess 60. With the retraction of the shaft 30, the springs 51 resiliently bias the camming plate 46 away from the guide plate 44 to assume the relative spacing shown in FIGS. 3 and 4.

As the camming plate 46 and guide plate 44 move apart, the blade holder 82 is slid rearwardly along the guide hole 98 in the direction of inclined axis $A_2$, by the engagement of the camming pin 92, with the camming slot 108. The rearward movement of the blade holder 82 thereby retracts the cutting blade 70, rearwardly away from the upper surface of the workpiece 12 to the fully retracted position shown in FIGS. 3 and 4. In this configuration, the cutting blade tip 72 is moved upwardly and radially outwardly from the axis $A_1$ so that the blade tip 72 is spaced rearwardly along the axis from the enlarged tip 116 of the piercing pin 114.

As the pin 114 moves upwardly, the plug 22 is moved against the knock-off pins 120, to strip it off the pin 114 by forcing it downwardly past the tip 116 in the manner shown in FIG. 6.

It is to be appreciated that the use of a cutting blade 70 which is inclined at an angle relative to the axis $A_1$ and blade holder 82 which slides within the inclined guide hole 98 to advance the blade 70 in the direction at which it is inclined, advantageously produces a waste plug 22 having a decreased likelihood of passing through the formed hole 11 and into an interior of the workpiece 12.

Figure 7:
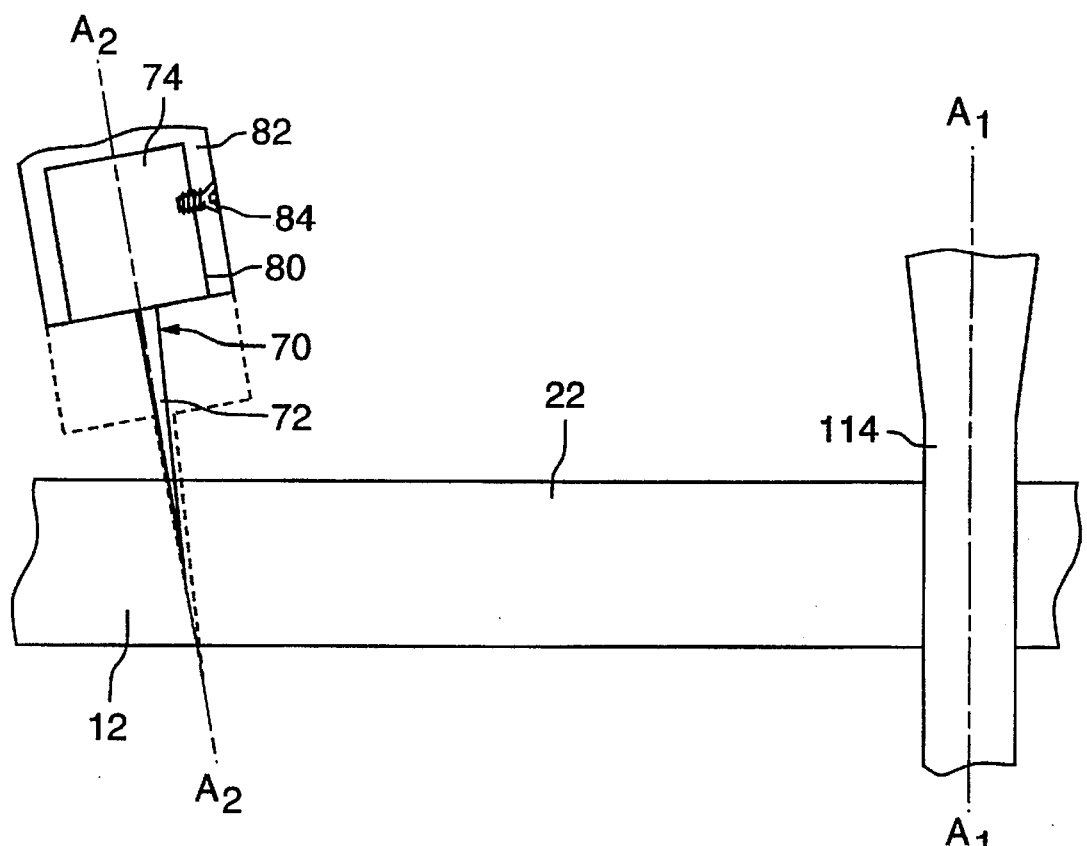
FIG. 7 shows an enlarged partial cross-sectional view of the workpiece, piercing pin and cutting head in cutting operation of the boring tool of FIG. 1.
Figure 8:
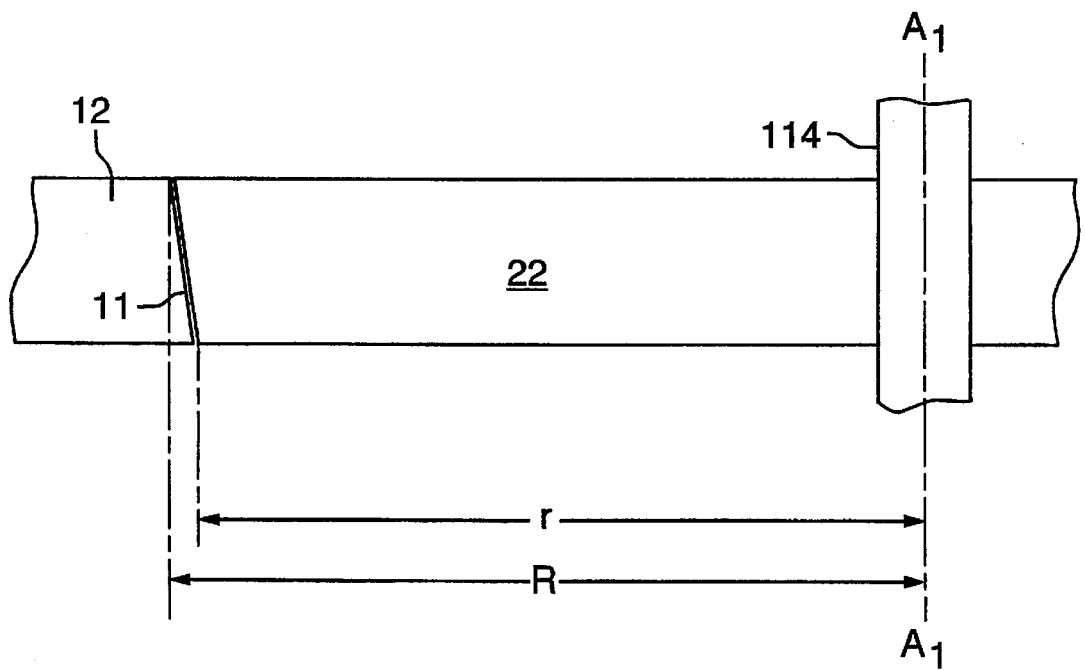
FIG. 8 shows an enlarged partial cross-sectional view of the workpiece and piercing pin following cutting operation and prior to the retraction of the cutting head assembly to the retracted position.

FIGS. 7 and 8 show in detail the path of advance of the cutting blade 70 through the wall of a workpiece 12 and the resulting plug 22 formed thereby. As seen best in FIGS. 5 and 7, as the camming plate 46 advances along the axis $A_1$ relative to the guide plate 44, the sliding movement of the blade holder 82 in the guide hole 98 moves the blade tip 72 substantially along the axis $A_2$, in a direction inclining forwardly at about 7° towards the axis $A_1$. It is to be appreciated, however, that depending on the thickness of the workpiece 12 side wall, the axis $A_2$ could also incline towards axis $A_1$ at an angle of between about 1° and 45°, and in the case of blow moulded workpieces used in the automotive industry, preferably inclines at an angle of between 4° and 15°.

The direction of advance of the blade tip 72 combined with the shark-tooth profile of the cutting blade 70 produces a plug 22 and hole 11 having tapered edges (seen best in FIG. 8), which taper inwardly in the forward direction along the path of cutting blade 70 movement. It is to be appreciated that the preferred shark-tooth profile of the cutting blade is selected so that the blade has a slight curvature which is substantially the same as the curvature of the arcuate path along which the blade 70 rotates.

Further, as a result of the angled movement of the cutting blade 70 through the workpiece 12, the tapered edge portions of the plug 22 and hole 11 are formed having a complementary shape. In this regard, the angle of inward movement of the cutting blade 70 is selected so that a larger diameter top portion of the produced plug 22 has a radius R which is greater than the radius r of the smallest diameter bottom portion of the hole 11. With this construction, the plug 22 which is produced is physically too large to pass through the hole 11, thereby substantially eliminating the possibility that waste plugs may inadvertently fall into the interior of the workpiece.

The use of a sensor 132 to lock the entire spindle assembly in the optimum position prior to moving the piercing pin 114 through the workpiece 12 and performing cutting, advantageously ensures that the cutting head assembly 14 and piercing pin 114 are in the optimum position for operation, regardless of surface variations between successive workpieces. While the use of a sensor 132 and locking sensor 127 are disclosed as preferred position sensing and locking mechanisms, other sensing and/or locking mechanisms are also possible and will now become apparent.

Although the preferred embodiment of the invention discloses the use of the drive motor 18 as continuously rotating the cutting blade 70 as it is brought into engagement with the workpiece 12, it is to be appreciated that the cutting blade 70 could equally be activated in rotational movement after being brought into contact with the workpiece 12, or rotated through one or two directions of rotational movement, depending on the material properties and temperature of the workpiece surface and specific blade construction.

While the Figures illustrate the invention as incorporating a single shark-tooth shaped cutting blade, it is to be appreciated that multiple and different shaped cutting blades could equally be used and will now become apparent.

Although the invention has been described with reference to preferred embodiments, it is not so limited. Many variations and modifications will now occur to persons skilled in the art. For a definition of the invention, reference may be made to the appended claims.

We claim:

1. A method of using a boring apparatus to form a hole in a workpiece, the apparatus comprising rotatable cutting means for cutting a portion of said workpiece as a generally circular plug, support means for supporting said cutting means thereon, the support means having a forward portion and being reciprocally movable along an axis between a first position wherein said forward portion is spaced towards said workpiece and a second position wherein said forward portion is moved away from said workpiece, drive means for driving said cutting means in rotational movement, and retaining means for releasably retaining said plug, the retaining means being activatable between an initial release position wherein said portion of said workpiece is released from said apparatus and a retaining position wherein said portion of said workpiece is retained thereby, said cutting means disposed on said forward portion and being rotatable about said axis, the cutting means including a cutting blade spaced radially from said axis, whereby the rotation of the cutting means rotates the cutting blade along an arcuate path, said cutting blade extending forwardly away from said support means at an angle inclined towards said axis, and being reciprocally movable between a retracted blade position and an extended blade position moved forwardly and radially inwardly relative to the retracted blade position, blade advance means for reciprocally moving said cutting blade between said retracted blade position and said extended blade position wherein on moving said cutting blade from the retracted blade position to the extended blade position, the blade advance means moving said cutting blade forwardly and in a radially inward direction toward said axis substantially at said angle at which said cutting blade is inclined, said hole formed by the steps of, positioning said support means in said second position and said cutting blade in said retracted blade position, moving said portion of said workpiece into alignment with said axis, moving said support means to said first position, activating said retaining means to said retaining position to retain said portion of said workpiece, and activating said blade advance means to move said cutting blade to said extended blade position in said radial inward direction through said workpiece while said cutting means is rotated by said drive means, wherein the advance of said cutting blade through the workpiece cuts said plug from a remainder of said workpiece and forms said hole with each of said plug and said hole having generally complementary tapered edge portions.

2. The method as claimed in claim 1 wherein said retaining means comprises, a reciprocally movable piercing pin extending forwardly from said forward portion at a position spaced radially inwardly from the arcuate path towards said axis, the pin movable between a forwardmost extended position and a retracted position wherein said pin is moved rearwardly from the extended position, the pin having an enlarged tip portion and a length selected so that when said support means is moved to said first position and said pin is biased to the extended position, the tip portion pierces and extends through the portion of the workpiece to couple the portion thereto in the retaining position, and said step of activating said retaining means comprises moving the pin from the retracted position to the extended position.

3. The method as claimed in claim 2 wherein said apparatus further includes sensor means for sensing the engagement of said pin with said portion of the workpiece, and locking means for locking said support means in position along said axis, said step of moving said support means to said first position comprises, moving said support means forwardly from said second position along said axis to a forward position wherein said sensing means first senses the engagement of said pin with the portion of the workpiece, and locking said support means in said forward position to substantially prevent axial movement therefrom.

4. The method as claimed in claim 3 wherein said blade advance means reciprocally moves said cutting blade at an angle inclined between approximately 4° and 15° relative to said axis.

5. The method as claimed in claim 2 wherein said blade advance means includes, blade retaining means for releasably retaining said cutting blade, guide means for guiding the blade retaining means in reciprocal movement in said radially inward direction and in a radially outward direction generally opposite said inward direction, the biasing means activatable to bias said blade retaining means between said retracted and extended positions, wherein said step of activating said blade advance means comprises the step of activating said biasing means to bias said blade retaining means to said extended blade position.

6. An apparatus for forming a hole in a workpiece, the apparatus comprising rotatable cutting means for cutting said workpiece to remove a portion thereof as a generally circular plug, support means for supporting said cutting means thereon, the support means having a forward portion and being reciprocally movable along an axis between a first position wherein said forward portion is spaced towards said workpiece and a second position wherein said forward portion is moved away from said workpiece, drive means for driving said cutting means in rotational movement, said cutting means disposed on said forward portion and being rotatable about said axis and including cutting blade means and blade advance means, the cutting blade means spaced radially from said axis, and extending forwardly away from said support means at an angle inclined towards said axis, whereby the rotation of the cutting means rotates the cutting blade means along an arcuate path centered on said axis, the blade advance means for moving said cutting blade means simultaneously forwardly and in a radially inward direction towards said axis substantially at said angle at which said cutting blade means is inclined, a reciprocally movable piercing pin movable between a forward position and a retracted position rearward of the forwardmost position, the pin projecting forwardly from said forward portion of the support means at a position spaced radially inwardly from said arcuate path towards said axis, positioning means activatable to move the pin between the forward and retracted positions, the pin having an enlarged tip portion and a length selected so that when said support means is moved to said first position and said pin is moved to the forward position, said tip-portion pierces and extends through the portion of the workpiece to couple it to said pin, and when the support means is in the first position the blade advance means is activatable to move the cutting blade means through the workpiece as said cutting means is rotated to cut said plug from said remainder of said workpiece and form said hole with each of said plug and said hole having generally complementary tapered edge portions.

7. An apparatus as claimed in claim 6 wherein said blade advance means includes, blade retaining means for retaining said cutting blade means, the blade retaining means being reciprocally movable between a retracted blade position wherein said cutting blade means is spaced from said workpiece, and an extended blade position wherein when said support means in said first position said cutting blade means is moved through said workpiece, guide means for guiding blade retaining means in reciprocal movement in said radially inward direction and in a radially outward direction generally opposite said inward direction, and biasing means activatable to bias said blade retaining means between said retracted blade position and said extended blade position.

8. A boring apparatus for forming a hole in a workpiece, the apparatus comprising rotatable cutting means for cutting a generally circular plug from a remainder said workpiece, support means for supporting said cutting means thereon, the support means having a forward portion and being reciprocally movable along an axis between a first position wherein said forward portion is spaced towards said workpiece, and a second position wherein said forward portion is moved away from said workpiece, drive means for driving said cutting means in rotational movement, and retaining means for releasably retaining said plug, said retaining means being movable between a retaining position wherein said plug cut from said remainder of said workpiece is retained by said retaining means to substantially prevent its movement through the hole, and a release position remote from said hole wherein said plug is released from said apparatus, said cutting means disposed on said forward portion and being rotatable about said axis, and including a cutting blade and blade advance means, the cutting blade spaced radially from said axis, and extending forwardly away from said support means at an angle inclined towards said axis, whereby the rotation of the cutting means rotates the cutting blade along a substantially arcuate path, the blade advance means for moving said cutting blade forwardly and in a radially inward direction towards said axis substantially at said angle at which said cutting blade is inclined, whereby when the support means is in the first position the blade advance means is activatable to move the cutting blade through the workpiece while said cutting means is rotated, to cut said plug from said remainder of said workpiece and form said hole, with each of said plug and said hole having generally complementary tapered edge portions.

9. An apparatus as claimed in claim 8 wherein said retaining means comprises a piercing pin which is reciprocally movable along said axis, and said apparatus further includes positioning means for reciprocally moving said pin, the pin having an enlarged tip portion and extending forwardly from said forward portion at a position spaced radially inwardly from said arcuate path of said blade towards said axis, the positioning means activatable to the pin between a forward position and a retracted position wherein said pin is moved rearwardly from the forward position, the pin having a length selected so that when said support means is moved to said first position and said pin is moved to the forward position, said tip portion pierces and extends through the workpiece to couple it to said pin.

10. An apparatus as claimed in claim 8 wherein said retaining means comprises an elongated piercing pin having an enlarged tip portion, said pin extending forwardly from said forward portion at a position spaced radially inwardly from said arcuate path towards said axis, the pin having length selected so that when said support means is moved to said first position, said tip portion pierces and extends through said workpiece to couple said workpiece to said pin.

11. An apparatus as claimed in claim 9 wherein said support means comprises a spindle rotatable about said axis, said drive means rotatably engaging said spindle, and said cutting means being coupled to said spindle for rotation therewith, and said piercing pin extending beyond said forward portion of said spindle in alignment with said axis.

12. An apparatus as claimed in claim 9 further including sensing means for sensing the engagement of said piercing pin with said workpiece, and locking means for locking said support means in said first position on said sensing means sensing contact of said pin with said workpiece.

13. An apparatus as claimed in claim 8 wherein the arcuate path of the cutting blade is substantially symmetrical about the axis.

14. An apparatus as claimed in claim 12 wherein said blade advance means includes, blade retaining means for releasably retaining said cutting blade, the blade retaining means being reciprocally movable between an unbiased retracted position wherein with said support means in said first position, said cutting blade is spaced from said workpiece, and a biased fully extended position wherein the said support means in said first position said cutting blade is moved through said workpiece, guide means for guiding blade retaining means in reciprocal movement in said radially inward direction and in a radially outward direction opposite said inward direction, and biasing means activatable to bias said blade retaining means between said retracted and extended positions.

15. An apparatus as claimed in claim 8 wherein said blade advance means moves said cutting blade forwardly at an angle inclined between approximately 4° and 15° relative to said axis.

16. An apparatus as claimed in claim 13 wherein said blade advance means includes reciprocally movable blade retaining means for retaining said cutting blade, guide means for guiding said blade retaining means in reciprocal movement in said forward and radially inward direction and in a rearward and radially outward direction substantially opposite said inward direction, and biasing for biasing the blade retaining means along the guide means in reciprocal movement.

17. An apparatus as claimed in claim 15 wherein said support means comprises a hollow cylindrical spindle rotatable about said axis, said cutting means being coupled to said spindle for rotation therewith, said drive means rotatably engaging said spindle to rotate said cutting means.

18. An apparatus as claimed in claim 8 wherein said cutting blade includes a shark tooth profile.

19. An apparatus as claimed in claim 14 wherein when said support means is locked in said first position, and said blade retaining means is in said retracted position, said cutting blade is spaced from said workpiece.

* * * * *